US008849477B2

(12) United States Patent
Brinkman

(10) Patent No.: US 8,849,477 B2
(45) Date of Patent: Sep. 30, 2014

(54) AVIONICS DISPLAY SYSTEM AND METHOD FOR GENERATING THREE DIMENSIONAL DISPLAY INCLUDING ERROR-COMPENSATED AIRSPACE

(75) Inventor: Ron Brinkman, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 976 days.

(21) Appl. No.: 12/251,307

(22) Filed: Oct. 14, 2008

(65) Prior Publication Data

US 2010/0094487 A1    Apr. 15, 2010

(51) Int. Cl.
    *G06F 7/70*     (2006.01)
    *G01F 19/00*     (2006.01)
    *G01C 25/00*     (2006.01)
    *G01C 23/00*     (2006.01)

(52) U.S. Cl.
    CPC ............... *G01C 23/00* (2013.01); *G01C 25/00* (2013.01)
    USPC ................... 701/14; 701/15; 701/16; 701/408

(58) Field of Classification Search
    CPC ................................ G01C 23/00; G01C 25/00
    USPC ................... 701/1, 3, 4, 10, 207, 14–16, 408; 340/945, 947, 951, 964, 979, 988; 73/178 R, 178 T
    See application file for complete search history.

(56) References Cited

U.S. PATENT DOCUMENTS

| | | | |
|---|---|---|---|
| 4,853,700 A * | 8/1989 | Funatsu et al. | 342/30 |
| 5,227,786 A * | 7/1993 | Hancock | 340/961 |
| 5,798,713 A | 8/1998 | Viebahn et al. | |
| 5,845,874 A | 12/1998 | Beasley | |
| 5,908,464 A * | 6/1999 | Kishigami et al. | 701/454 |
| 6,021,374 A | 2/2000 | Wood | |
| 6,085,150 A | 7/2000 | Henry et al. | |
| 6,292,721 B1 | 9/2001 | Conner et al. | |

(Continued)

FOREIGN PATENT DOCUMENTS

| | | |
|---|---|---|
| CA | 2151788 A1 | 12/1996 |
| DE | 2458664 A1 | 6/1976 |

(Continued)

OTHER PUBLICATIONS

USPTO Notice of Allowance for U.S. Appl. No. 12/435,753 dated Sep. 12, 2012.

(Continued)

*Primary Examiner* — Helal A Algahaim
*Assistant Examiner* — Nga X Nguyen
(74) *Attorney, Agent, or Firm* — Ingrassia Fisher & Lorenz, P.C.

(57) ABSTRACT

Embodiments of a method are provided that may be carried out by an avionics display system deployed on an aircraft and including a monitor. The avionics display system receives position data indicative of the aircraft's detected position from at least one data source. In one embodiment, the method includes the steps of: (i) attributing an error characteristic to the data source, (ii) identifying an airspace assigned to the aircraft at a given time, and (iii) establishing an error-compensated airspace as a function of the error characteristic and the assigned airspace. The aircraft's actual position remains within the assigned airspace provided that the aircraft's detected position resides within the error-compensated airspace. A visual representation of the outer boundaries of the error-compensated airspace is generated on the monitor.

20 Claims, 5 Drawing Sheets

(56) References Cited

U.S. PATENT DOCUMENTS

| | | | |
|---|---|---|---|
| 6,314,366 B1* | 11/2001 | Farmakis et al. | 701/201 |
| 6,320,579 B1 | 11/2001 | Snyder et al. | |
| 6,433,729 B1 | 8/2002 | Staggs | |
| 6,484,071 B1* | 11/2002 | Conner et al. | 701/9 |
| 6,690,299 B1 | 2/2004 | Suiter | |
| 6,691,004 B2 | 2/2004 | Johnson et al. | |
| 6,711,477 B1 | 3/2004 | Johnson et al. | |
| 6,798,423 B2 | 9/2004 | Wilkins, Jr. et al. | |
| 6,963,291 B2 | 11/2005 | Holforty | |
| 6,970,104 B2 | 11/2005 | Knecht et al. | |
| 6,995,690 B1 | 2/2006 | Chen et al. | |
| 7,006,032 B2 | 2/2006 | King et al. | |
| 7,010,398 B2 | 3/2006 | Wilkins, Jr. et al. | |
| 7,030,780 B2 | 4/2006 | Shiomi et al. | |
| 7,212,917 B2 | 5/2007 | Wilson, Jr | |
| 7,218,245 B2 | 5/2007 | Wyatt et al. | |
| 7,342,515 B2 | 3/2008 | He | |
| 7,483,787 B2* | 1/2009 | Dehn | 701/202 |
| 7,612,716 B2 | 11/2009 | Smith | |
| 7,650,232 B1* | 1/2010 | Paielli | 701/205 |
| 7,869,943 B1* | 1/2011 | Simon | 701/436 |
| 2002/0075171 A1 | 6/2002 | Kuntman et al. | |
| 2002/0116097 A1* | 8/2002 | Block et al. | 701/9 |
| 2002/0120391 A1 | 8/2002 | Nehls, III | |
| 2003/0036828 A1* | 2/2003 | Conner et al. | 701/9 |
| 2003/0132860 A1 | 7/2003 | Feyereisen et al. | |
| 2003/0210228 A1 | 11/2003 | Ebersole et al. | |
| 2004/0015274 A1 | 1/2004 | Wilkins, Jr. et al. | |
| 2004/0030465 A1* | 2/2004 | Conner et al. | 701/16 |
| 2004/0128070 A1 | 7/2004 | Schmidt et al. | |
| 2004/0143393 A1 | 7/2004 | Knecht et al. | |
| 2004/0160341 A1 | 8/2004 | Feyereisen et al. | |
| 2004/0189492 A1* | 9/2004 | Selk et al. | 340/973 |
| 2005/0075763 A1 | 4/2005 | Brigode | |
| 2005/0206533 A1 | 9/2005 | Rogers et al. | |
| 2006/0069497 A1* | 3/2006 | Wilson, Jr. | 701/120 |
| 2006/0089760 A1 | 4/2006 | Love et al. | |
| 2006/0241820 A1* | 10/2006 | Dwyer et al. | 701/3 |
| 2006/0250280 A1 | 11/2006 | Chen et al. | |
| 2006/0265109 A1* | 11/2006 | Canu-Chiesa et al. | 701/3 |
| 2007/0150124 A1 | 6/2007 | Wipplinger et al. | |
| 2007/0225874 A1 | 9/2007 | Pepitone | |
| 2007/0265776 A1 | 11/2007 | Meunier et al. | |
| 2008/0140270 A1 | 6/2008 | Davis et al. | |
| 2008/0174454 A1 | 7/2008 | Bitar et al. | |
| 2008/0319647 A1* | 12/2008 | Dehn | 701/202 |
| 2011/0202206 A1* | 8/2011 | Karthikeyan et al. | 701/3 |

FOREIGN PATENT DOCUMENTS

| | | |
|---|---|---|
| EP | 2196974 A1 | 6/2010 |
| EP | 2202489 A2 | 6/2010 |
| WO | 0071985 A1 | 11/2000 |

OTHER PUBLICATIONS

USPTO Office Action, U.S. Appl. No. 12/435,753; Notification date Apr. 20, 2012.

USPTO Office Action, U.S. Appl. No. 12/435,753; Notification date Dec. 20, 2011.

USPTO Office Action, U.S. Appl. No. 12/435,753; Notification date Jul. 8, 2011.

EP Search Report, EP 10160970.9-1236/2249126 dated Feb. 11, 2010.

EP Search Report, EP 10160970.9-1236 dated Aug. 26, 2010.

EP Search Report for Application No. EP 09 172 486.4 dated Feb. 24, 2014.

EP Examination Report for Application No. EP 09 172 486.4 dated Mar. 17, 2014.

* cited by examiner

AVIONICS DISPLAY SYSTEM AND METHOD FOR GENERATING THREE DIMENSIONAL DISPLAY INCLUDING ERROR-COMPENSATED AIRSPACE

TECHNICAL FIELD

The present invention relates generally to vehicular display systems and, more particularly, to an avionics display system and method for generating a three dimensional (e.g., perspective) display including a visual representation of an error-compensated airspace.

BACKGROUND

An aircraft flight plan typically specifies a departure point, an arrival point, estimated time en route, and various other routing information. The routing information may include a charted or planned flight path including a number of waypoints joined by line segments. An airway may encompass and extend longitudinally with each line segment of the planned flight path. In general, each airway is a three-dimensional corridor within which the aircraft's actual position is expected to remain during flight. Within the United States, a representative airway may have a width of eight nautical miles (NMs) and a height of 1,000 vertical feet between FL 290 (29,000 feet) and FL 41,000 (feet) in accordance with regulatory standards, such as Domestic Reduced Vertical Separation Minima.

Utilizing the planned flight path and the estimated time en route specified by the aircraft's flight plan, an air traffic controller may determine the aircraft's expected nominal position for any given time. Similarly, the air traffic controller may determine the particular segment of an airway in which the aircraft should reside at a particular time. This airway segment defines a spatial volume (referred to herein as the "assigned airspace") within which an aircraft's actual position is expected to reside at the selected time. In instances wherein an airway is not accounted for by a flight plan (e.g., as may occur during navaid or direct routing), the assigned airspace may be determined based upon the aircraft's flight rules, traffic congestion, the accuracy of data provided by ground-based navigational devices (e.g., distance measuring equipment), and other such criteria.

Conventional avionics display systems visually provide a pilot and crew with a considerable amount of navigational information. This information typically includes the aircraft's current detected position as indicated by navigational equipment onboard the aircraft (e.g., a global positioning system (GPS) device, altimeters, etc.). However, the aircraft's detected position, and thus the aircraft position indicated by an avionics display system, may not correspond to the aircraft's actual position due to inaccuracies inherent in the navigational equipment. Conventional avionics display system do not visually correlate, in an intuitive manner, the relationship between the aircraft's assigned airspace, the aircraft's detected position, and the potential inaccuracies inherent in the aircraft's detected position.

Therefore, to further increase the situational awareness of pilot and crew, it is desirable to provide an avionics display system and method for generating a three dimensional display that visually indicates the spatial volume within which an aircraft's detected position should remain to ensure that the aircraft's actual position resides within the aircraft's assigned airspace. Preferably, such an avionics display system and method would display this spatial volume (referred to herein as the "error compensated airspace") in an manner that is intuitive and readily-comprehendible. Other desirable features and characteristics of the present invention will become apparent from the subsequent detailed description of the invention and the appended claims, taken in conjunction with the accompanying drawings and this background of the invention.

BRIEF SUMMARY

A method is provided that may be carried out by an avionics display system deployed on an aircraft and including a monitor. The avionics display system receives position data indicative of the aircraft's detected position from at least one data source. In one embodiment, the method includes the steps of: (i) attributing an error characteristic to the data source, (ii) identifying an airspace assigned to the aircraft at a given time, and (iii) establishing an error-compensated airspace as a function of the error characteristic and the assigned airspace. The aircraft's actual position remains within the assigned airspace provided that the aircraft's detected position resides within the error-compensated airspace. A visual representation of the outer boundaries of the error-compensated airspace is generated on the monitor.

A program product is further provided for use in conjunction with an avionics display system deployed on an aircraft and including a monitor. The display system receives position data indicative of the aircraft's detected position from at least one data source. In one embodiment, the program product includes an avionics display program adapted to: (i) attribute an error characteristic to the data source; (ii) identify an airspace assigned to the aircraft at a given time; and (iii) establish an error-compensated airspace as a function of the error characteristic and the assigned airspace. The aircraft's actual position remains within the assigned airspace provided that the aircraft's detected position resides within the error-compensated airspace. The program product is further adapted to generate on the monitor a visual representation of the outer boundaries of the error-compensated airspace. Computer-readable media bears the avionics display program.

An avionics display system is further provided for deployment onboard an aircraft including at least one position-determining data source. The position-determining data source provides the avionics display system with data indicative of the detected position of the aircraft. In one embodiment, the avionics display system includes a monitor and a processor operatively coupled to the monitor. The processor is configured to: (i) attribute an error characteristic to the data source; (ii) identify an airspace assigned to the aircraft at a given time; (iii) establish an error-compensated airspace as a function of the error characteristic and the assigned airspace, the aircraft's actual position remaining within the assigned airspace provided that the aircraft's detected position resides within the error-compensated airspace; and (iv) generating on the monitor a visual representation of the outer boundaries of the error-compensated airspace.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
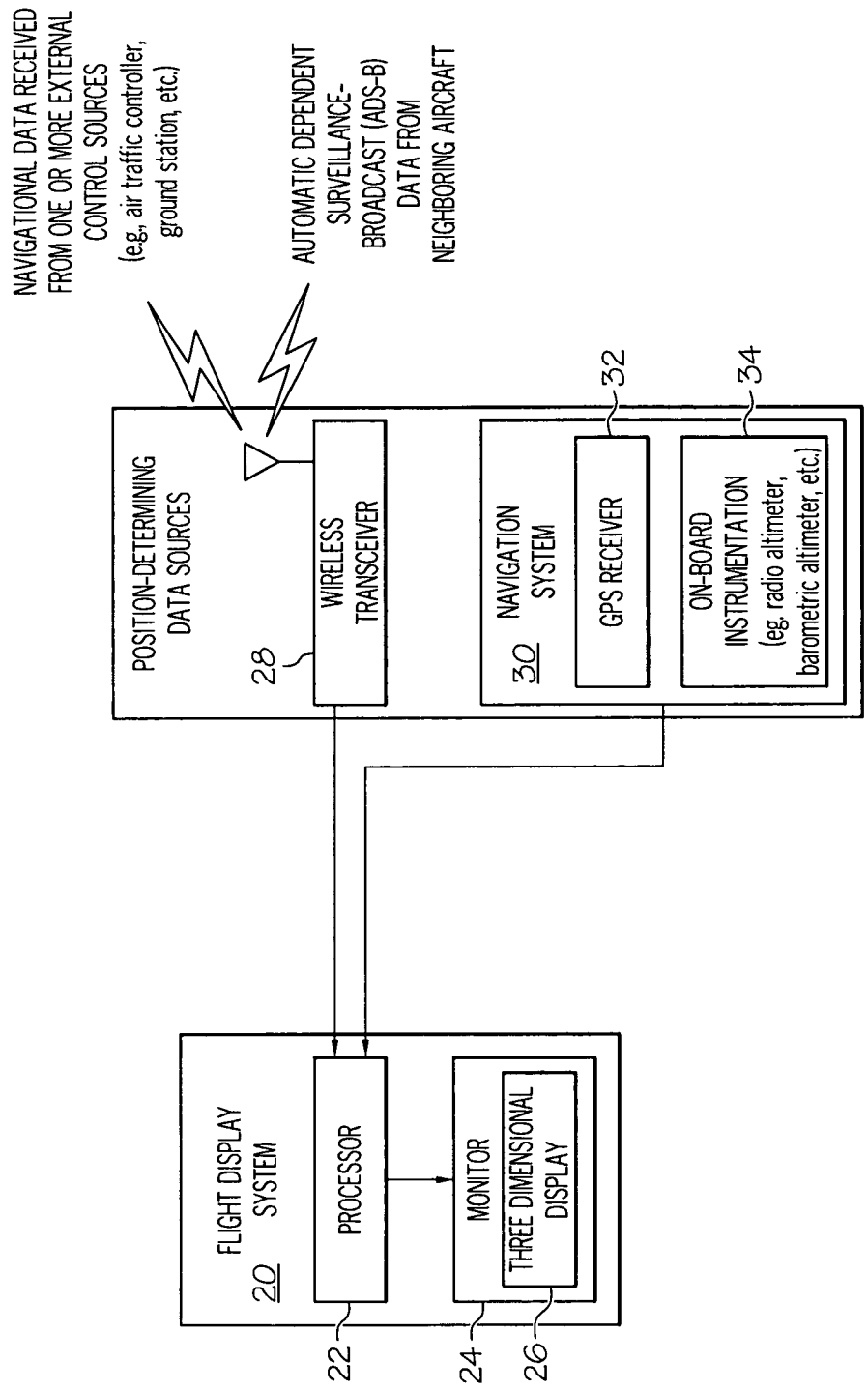
FIG. 1 is a functional block diagram of a generalized avionics display system in accordance with an exemplary embodiment.

FIG. 1 is a functional block diagram of a generalized avionics display system 20 in accordance with an exemplary embodiment. Avionics display system 20 includes at least one processor 22 and at least one monitor 24, which is operatively coupled to processor 22. During operation of avionics display system 20, processor 22 drives monitor 24 to produce a three dimensional (e.g., perspective) display 26 that visually provides a pilot and crew with navigational informational pertaining to the host aircraft (e.g., the aircraft's planned flight path, the aircraft's projected flight path, the aircraft's current detected position, etc.). Examples of three dimensional display 26 are discussed more fully below in conjunction with FIGS. 4 and 5.

Processor 22 may comprise, or be associated with, any suitable number of individual microprocessors, flight control computers, navigational equipment, memories, power supplies, storage devices, interface cards, and other standard components known in the art. In this respect, the processor 22 may include or cooperate with any number of software programs (e.g., avionics display programs) or instructions designed to carry out the various methods, process tasks, calculations, and control/display functions described below. In a preferred embodiment, processor 22 assumes the form of a Flight Management Computer of the type commonly deployed within a Flight Management System (FMS).

Image-generating devices suitable for use as monitor 24 include various analog (e.g., cathode ray tube) and digital (e.g., liquid crystal, active matrix, plasma, etc.) display devices. In certain embodiments, monitor 24 may assume the form of a Head-Down Display (HDD) or a Head-Up Display (HUD) included within an aircraft's Electronic Flight Instrument System (EFIS). Monitor 24 may be disposed at various locations throughout the cockpit. For example, monitor 24 may comprise a primary flight display (PFD) and reside at a central location within the pilot's primary field-of-view. Alternatively, monitor 24 may comprise a secondary flight deck display, such as an Engine Instrument and Crew Advisory System (EICAS) display, mounted at a location convenient observation by the aircraft crew but that generally resides outside of the pilot's primary field-of-view. In still further embodiments, monitor 24 may be worn by one or more members of the flight crew.

Processor 22 includes one or more inputs operatively coupled to one or more position-determining data sources. During operation of display system 20, the position-determining data sources continually provide processor 22 with data indicative of the host aircraft's detected position (e.g., latitude, longitude, and/or altitude). In the exemplary embodiment illustrated in FIG. 1, these position-determining data sources include a wireless transceiver 28 and a navigation system 30, which are operatively coupled to first and second inputs of processor 22, respectively. Navigation system 30 includes global positioning system (GPS) receiver 32 and various other on-board instrumentation 34, such as a radio altimeter, a barometric altimeter, and the like. In a preferred embodiment, navigation system 30 may be included within a FMS; and one or more of the devices encompassed by on-board instrumentation 34 may be included within a Terrain Awareness and Warning System (TAWS), such as an Enhanced Ground Proximity Warning System (EGPWS).

Wireless transceiver 28 is considered a position-determining data source in that transceiver 28 receives navigational data from external control sources and relays this data to processor 22. The external control sources from which wireless transceiver 28 may receive navigational data include, but are not limited to, Air Traffic Control Centers, Terminal Radar Approach Control Facilities, Flight Service Stations, control towers, and other such ground-based navigational facilities. In addition, wireless transceiver 28 may periodically receive Automatic Dependent Surveillance-Broadcast (ADS-B) data from neighboring aircraft. The ADS-B data may include, for example, state vectors pertaining to the neighboring aircraft. A particular state vector may be utilized to determine a neighboring aircraft's current position and projected flight path, which may then be displayed on monitor 24 in the manner described below in conjunction with FIGS. 4 and 5. In one specific example, wireless transceiver 28 may periodically receive Traffic Information Services-Broadcast (TIS-B) data from ground stations that report, for example, state vector data regarding unequipped aircraft or aircraft equipped with another ADS-B link.

Figure 2:
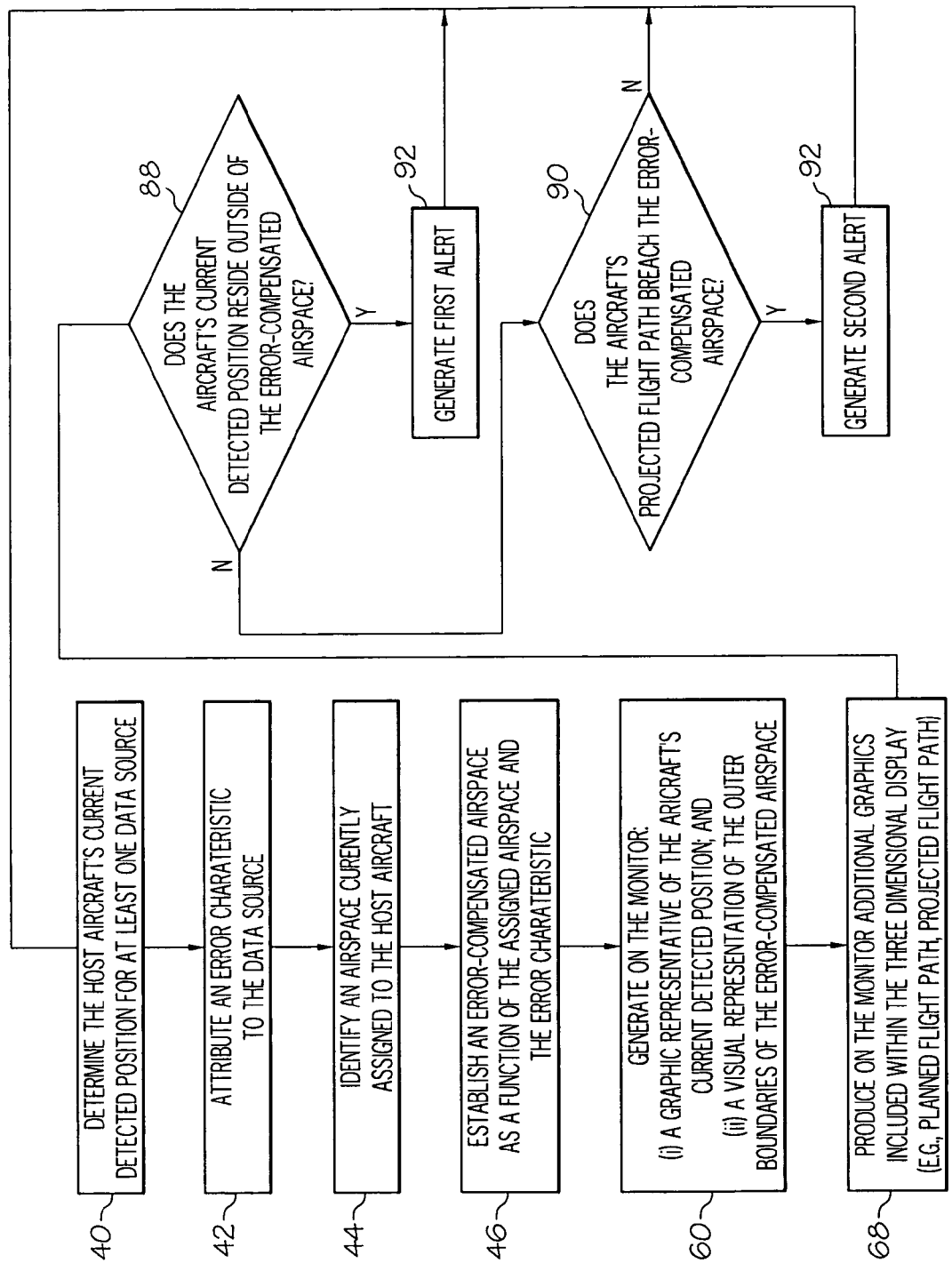
FIG. 2 is a flowchart illustrating an exemplary process that may be carried out by the avionics display system shown in FIG. 1.

FIG. 2 is a flowchart illustrating an exemplary process that may be carried out by processor 22 to generate three dimensional display 26 (FIG. 1) on monitor 24 (FIG. 1). To commence the exemplary process (STEP 40), processor 22 first determines the host aircraft's current detected position from at least one of the position-determining data sources shown in FIG. 1; e.g., wireless transceiver 28, GPS receiver 32, and/or on-board instrumentation 34. Next (STEP 42), processor 22 attributes an error-characteristic with the position-determining data source utilized to determine the host aircraft's detected position. Processor 22 may attribute an error characteristic to the relevant data source by recalling (e.g., from a memory included within processor 22) an error characteristic associated with the relevant position-determining data source. For example, if processor 22 utilizes data provided by GPS receiver 32 to determine the host aircraft's detected position, processor 22 may utilize a two-dimensional lookup table to recall a pre-determined error characteristic associated with GPS receiver 32 (e.g., ±100 vertical feet and ±50 horizontal feet). Notably, this pre-determined error characteristic may be adjusted in relation to external criteria. For example, the error characteristic associated with GPS receiver 32 may be adjusted in relation to the number of available satellites, the positioning of available satellites, weather conditions (e.g., humidity), and other such criteria. Processor 22 may also recall a predetermined error characteristic in this manner when receiving navigational data from an external control source (e.g., an air traffic controller) via wireless transceiver 28. Alternatively, data indicative of an error characteristic may be included within the information wirelessly provided to processor 22 by the external control source.

After attributing an error-characteristic to the position-determining data source (STEP 42), processor 22 identifies the airspace currently assigned to the host aircraft (STEP 44). If the host aircraft's is flying within an airspace specified by the aircraft's flight plan, processor 22 may identify the currently assigned airspace by determining the particular segment of the airway in which the aircraft is expected to reside at the current time. Alternatively, in instances wherein an airway is not accounted for by a flight plan (e.g., as may occur during navaid or direct routing), processor 22 may identify the assigned airspace based upon the aircraft's flight rules, traffic congestion, the accuracy of data provided by ground-based navigational devices (e.g., distance measuring equipment), and other such criteria. As a still further alternative, the aircraft's current assigned airspace may be communicated to processor 22 by an external control source (e.g., an air traffic controller) via wireless transceiver 28 (FIG. 1).

Figure 3:
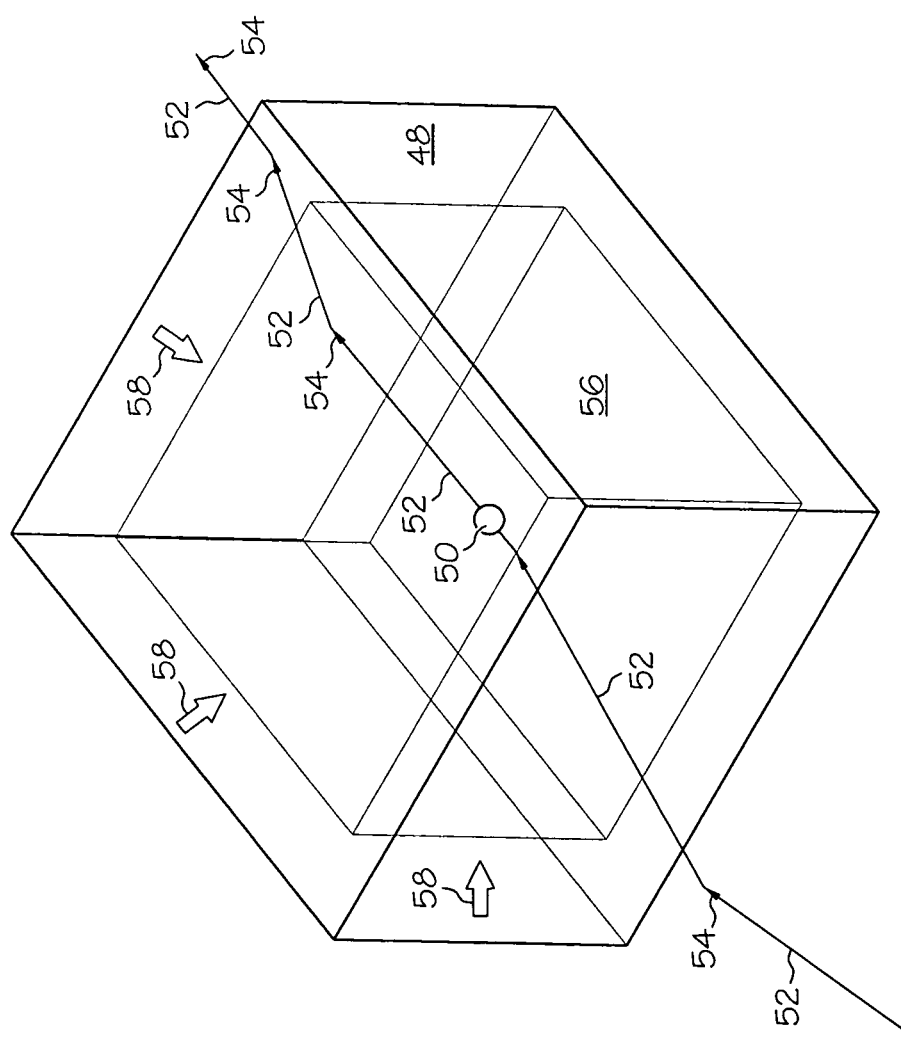
FIG. 3 is an isometric view illustrating one manner in which the error-compensated airspace may be established as a function of the assigned airspace and a determined error characteristic.

Next, at STEP 46, processor 22 establishes an error-compensated airspace as a function of the currently-assigned airspace and the error-characteristic attributed to the data source. FIG. 3 conceptually illustrates one manner in which processor 22 may establish the error-compensated airspace during STEP 46. In the context of FIG. 3, larger wireframe box 48 represents the outer boundaries of the aircraft's currently-assigned airspace, smaller wireframe box 56 represents the out boundaries of the error-compensated airspace, disc-shaped marker 50 represents the aircraft's expected nominal position, and line segments 52 and waypoint markers 54 collectively represent a leg of the aircraft's planned flight path. As can be seen in FIG. 3, the expected nominal position (disc-shaped marker 50) resides at a given location along aircraft's planned flight path (line segments 52) and is encompassed by the error-compensated airspace (smaller wireframe box 56). The error-compensated airspace (smaller wireframe box 56) is, in turn, encompassed by the currently-assigned airspace (larger wireframe box 48). In this particular example, the aircraft's assigned airspace and the error-compensated airspace each have a boxed (i.e., a regular hexahedron) geometry. This example notwithstanding, the currently-assigned airspace (larger wireframe box 48) and the error-compensated airspace (smaller wireframe box 56) may assume other polygonal shapes, as well as spherical and conical shapes, in other contexts. Furthermore, the error-compensated airspace may not always assume the same form as does the currently-assigned airspace.

As previously stated, and as indicated in FIG. 3 by arrows 58, the assigned airspace (smaller wireframe box 56) is derived as a function of the currently assigned airspace (larger wireframe box 48) taken in conjunction with the error characteristic attributed to the positioning-determining data source or sources. To continue the simplified example introduced above, if the position of the host aircraft is detected utilizing GPS receiver 32, and processor 22 attributes an error characteristic to GPS receiver 32 of ±100 vertical feet and ±50 horizontal feet, then processor 22 may establish the outer boundaries of the error-compensated airspace in the following manner. If the total vertical clearance of the assigned airspace is 1,000 feet, processor 22 will determine the upper boundary of the assigned airspace to be 500 feet above the aircraft's expected nominal position, as taken along a first axis. Processor 22 will further determine the upper boundary of the error-compensated airspace to be 100 feet below this position or, stated differently, 400 feet above the expected nominal position of the host aircraft, as taken along the first axis. Similarly, processor 22 may determine the lower boundary of the error-compensated airspace to be 100 feet above the lower boundary of the assigned airspace or 400 feet below the expected nominal position of the host aircraft, as taken along the first axis. Furthermore, if the forward-aft length of the assigned airspace is 10,000 feet, processor 22 may determine the forward and aft boundaries of the error-compensated airspace to each be 4,450 feet from the expected nominal position of the host aircraft, as taken along a second axis perpendicular to the first axis. Finally, if the left-right width of the assigned airspace is 5,000 feet, processor 22 may determine the left and right boundaries of the error-compensated airspace to each be 2,450 feet from the aircraft's expected nominal position, as taken along a third axis orthogonal to the first and second axes.

Figure 4:
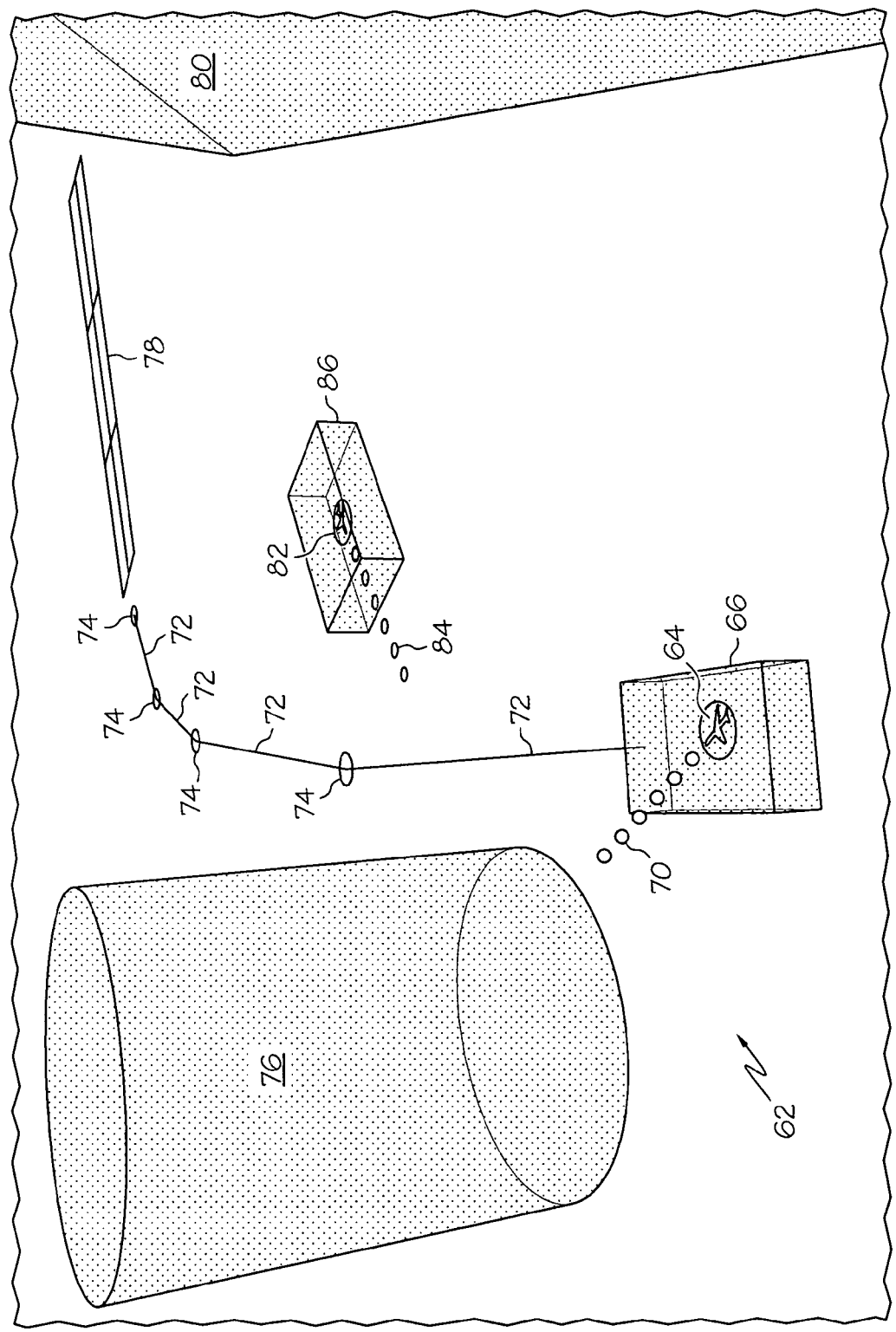
FIGS. 4 and 5 are first and second snap shots, respectively, of an exemplary three dimensional display including a graphic indicative of an error-compensated airspace that may be generated by the avionics display system shown in FIG. 1 when performing the exemplary process shown in FIG. 2.

Referring once again to FIGS. 1 and 2, and with specific reference to STEP 60 of FIG. 2, processor 22 next generates on monitor 24: (i) a graphic representing the aircraft's current detected position as indicated by the position-determining data source or sources, and (ii) a visual representation of the outer boundaries of the error-compensated airspace. FIG. 4 illustrates a first snap shot of a three dimensional display 62 that may be generated by processor 22 on monitor 24 during STEP 60. In this particular example, the host aircraft's detected position is visually expressed by a disc-shaped aircraft icon 64; and the outer boundaries of the error-compensated airspace are visually indicated by three dimensional wireframe box 66. Furthermore, at least a portion of the spatial volume contained within wireframe box 66 may be shaded or semi-opaque; e.g., as shown in FIG. 4, the entire volume of the error-compensated airspace may be shaded or semi-opaque (represented in FIG. 4 by dotting). Of course, other symbology may also be employed; e.g., in alternative embodiments, only the outer surfaces of the error-compensated airspace may be shaded or semi-opaque (as appearing herein, also encompassed by the phrase "a shaded portion of the error-compensated airspace"). In referring to FIG. 4, it will be noted that three dimensional display 62 is generated as a perspective view taken from a conceptual chase plane located outside of the host aircraft's error-compensated airspace; however, in alternative embodiments, three dimensional display 62 may be generated as an isometric view seen from various other vantage points (e.g., from a chase located within the error-compensated airspace, from the host aircraft's cockpit, etc.).

Referring collectively to FIGS. 1, 2, and 4, processor 22 next produces on monitor 24 any additional graphics to be included within the three dimensional display (STEP 68). For example, and as indicated in FIG. 4, processor 22 may further generate graphics indicative of the aircraft's projected flight path (represented by dotted line 70 in FIG. 4); the aircraft's planned flight path (represented by solid line segments 72 connecting waypoint markers 74); weather, such as a storm cell (represented by wireframe cylinder 76); terrestrial features, such as a runway (represented by runway graphic 78); restricted airspace (represented by wireframe polygon 80); political boundaries; and other information useful in the piloting of an aircraft. As will be appreciated by one skilled in the field, geographical features may be produced as rendered or "synthetic" terrain. During STEP 68, processor 22 may also generate graphics indicative of the detected position and projected flight path of neighboring aircraft, provided that the neighboring aircraft is within a predetermined distance of the host aircraft. For example, and as shown in FIG. 4, the detected position and the projected flight path of a neighboring aircraft may be visually indicated by a second disc-shaped aircraft icon 82 and a second dotted line 84, respectively. The detected position and the projected flight path of the neighboring aircraft may be determined from data provided by an external control source, such a ground station broadcasting TIS-B data, or by the neighboring aircraft itself; e.g., the neighboring aircraft may broadcast ADS-B data indicating its state vector as explained above. Furthermore, if processor 22 is provided with sufficient data to reliably identify an error-compensated airspace for the neighboring aircraft, processor 22 may further generate a graphic indicative of the neighboring aircraft's error-compensated airspace (e.g., three dimensional wireframe box 86 shown in FIG. 4); however, this is by no means necessary.

After producing additional graphics included within the three dimensional display (STEP 68), processor 22 determines whether the aircraft's current detected position resides outside of the error-compensated airspace (STEP 88 shown in FIG. 2). If the aircraft's current detected position does not reside outside of the error-compensated airspace, processor 22 continues onward to STEP 90. However, if the aircraft's current detected position resides outside of the error-compensated airspace, and thus if the aircraft's actual position could potentially reside outside of the aircraft's assigned airspace, processor 22 generates a first alert (STEP 92). The first alert may be visual, audible, and/or haptic. For example, the first alert may include an alteration in the appearance of the graphic representing the outer boundaries of the error-compensated airspace; e.g., wireframe box 66 may flash. In a preferred embodiment, processor 22 causes at least a portion of wireframe box 66 (and the spatial volume therein) to change to a first warning color (e.g., red). Processor 22 then returns to STEP 40, and the process is repeated.

If, during STEP 88, processor 22 determines aircraft's current detected position resides within the error-compensated airspace, processor 22 next determines whether the aircraft's projected flight path breaches the assigned airspace (STEP 90) within a given time period (e.g., on the order of a few seconds). If the aircraft's projected flight path does not breach the assigned airspace, processor 22 returns to STEP 40; and the process is repeated. If, instead, the aircraft's projected flight path breaches the assigned airspace, processor 22 generates a second alert (STEP 92). Like the first alert, the second alert may be visual, audible, and/or haptic. However, the second alert need not convey the same level of urgency as does the first alert. In a preferred embodiment, the second alert includes alteration in the appearance of the graphic representing the outer boundaries of the error-compensated airspace; e.g., processor 22 may cause wireframe box 66 (and the spatial volume therein) to change to a second warning color (e.g., yellow). Processor 22 then returns to STEP 40, and the process is repeated.

Figure 5:
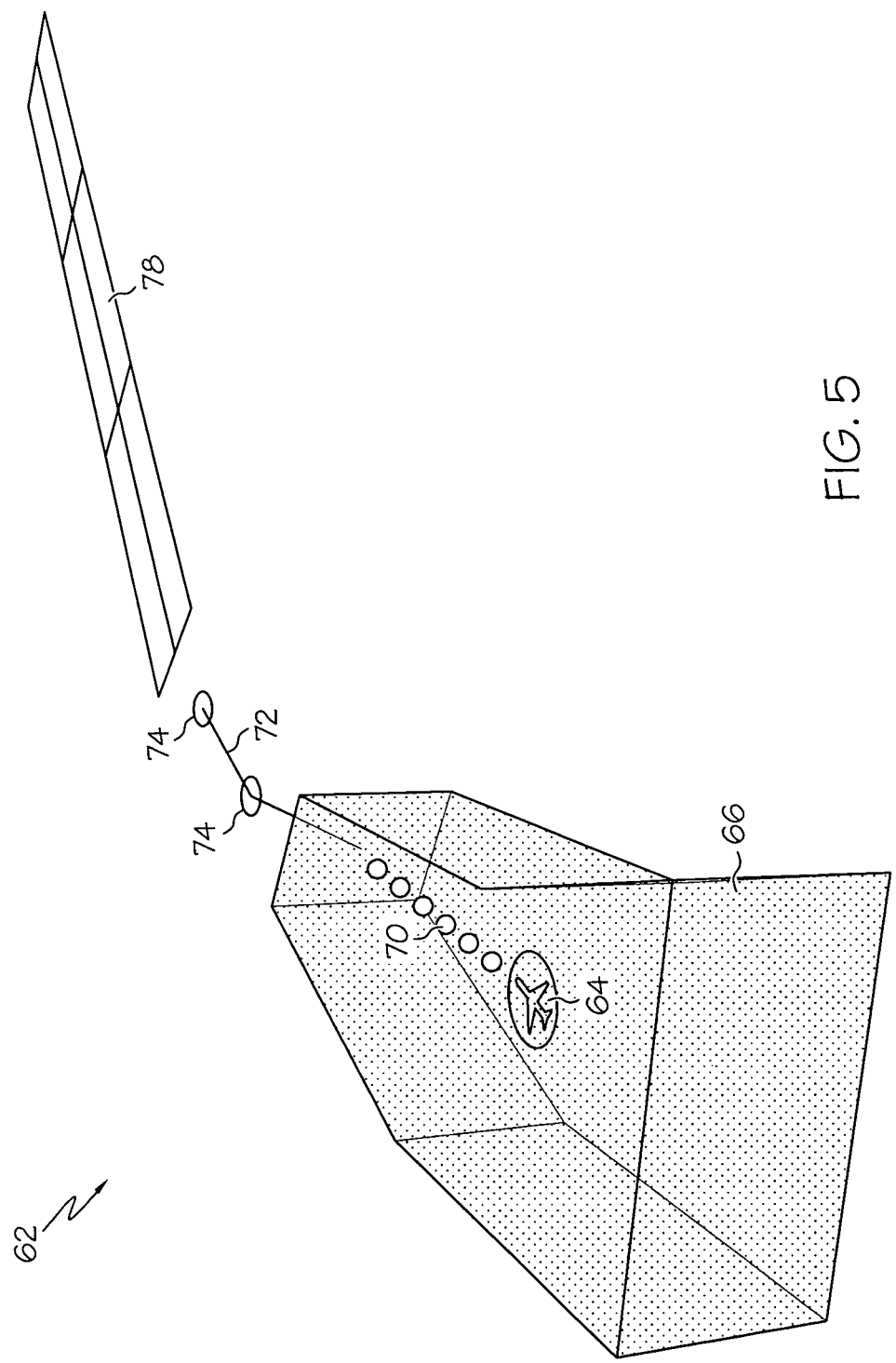

Processor 22 may repeatedly perform the above-described process steps at a predetermined refresh rate (e.g., several times a second) to continually update three dimensional display 62 and the visual representation of the error-compensated airspace (e.g., wireframe box 66). As a result, the shape, dimensions, and orientation of the visual representation of the error-compensated airspace may transition and evolve in real-time as the aircraft progresses along its flight plan. For example, the volume of the error-compensated airspace, and thus the visual representation of the error-compensated airspace generated by processor 22, may decrease in volume if the error characteristic of position-determining data source increases (e.g., due to adverse weather conditions). As another example, the volume of the error-compensated airspace, and thus the visual representation of the error-compensated airspace, may decrease as the volume of the aircraft's assigned airspace decreases due to, for example, an increase in local traffic. Further emphasizing the latter point, FIG. 5 illustrates a second snap shot of the three dimensional display 62 that may be generated by processor 22 on monitor 24. By comparing FIG. 5 to FIG. 4, it can be seen that the host aircraft has further approached the runway (indicated by runway graphic 78). As the aircraft nears the runway, the volume of the assigned airspace, and thus the volume of the error-compensated airspace, decreases. Wireframe box 66 conveys this volumetric decrease in an intuitive manner by tapering downward from its aft outer boundary toward its forward outer boundary. Furthermore, if the aircraft were unable to complete its initial landing attempt, processor 22 may generate on monitor 24 a three dimensional display including a visual representation of an error-compensated airspace corresponding to the "go-around" airspace; i.e., an airspace through which the aircraft may travel to circle about and reposition itself for a subsequent landing attempt.

It should thus be appreciated that there has been provided an avionics display system and method for generating a three dimensional display visually indicating an error-compensated airspace within which an aircraft's detected position should remain to ensure that the aircraft's actual position resides within an aircraft's assigned airspace. It should further be appreciated that the above-described avionics display system and method visually indicates the error-compensated airspace in an intuitive and readily-comprehendible manner thereby increasing the situational awareness of the pilot and crew. While the foregoing exemplary embodiment was described above in the context of a fully functioning computer system (i.e., avionics display system 20 shown in FIG. 1), those skilled in the art will recognize that the mechanisms of the present invention are capable of being distributed as a program product (i.e., an avionics display program) and, furthermore, that the teachings of the present invention apply to the program product regardless of the particular type of computer-readable media (e.g., floppy disc, hard drive, memory card, optical disc, etc.) employed to carry-out its distribution. Furthermore, although the foregoing has described the error-compensated airspace as visually demarcating a spatial volume in which the aircraft's detected position should remain to ensure that the aircraft's actual position remains within an assigned airspace during flight, the error-compensated airspace may also indicate a spatial volume in which the aircraft's detected position should remain to ensure that the aircraft's actual position remains within a predetermined space (e.g., a runway, a taxiway, or a gate) when traveling on the ground. Finally, although described above in the context of an aircraft, embodiments of the method and system are equally applicable to spacecraft.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A method to be carried out by an avionics display system deployed on an aircraft and including a monitor, the avionics display system receiving position data indicative of the aircraft's detected position from at least one data source comprising instrumentation deployed onboard the aircraft or remote from the aircraft, the method comprising:

attributing an instrumentation error characteristic to the data source;

identifying an airspace assigned to the aircraft at a given time;

reducing the volume of the assigned airspace based upon the magnitude of the instrumentation error characteristic in at least one dimension to determine an error-compensated airspace, the aircraft's actual position remaining within the assigned airspace provided that the aircraft's detected position resides within the error-compensated airspace; and generating on the monitor a visual representation of the outer boundaries of the error-compensated airspace;

wherein, in determining the error-compensated airspace, the volume of the assigned airspace is reduced as the instrumentation error characteristic increases.

2. A method according to claim 1 further comprising the step of generating on the monitor a graphic representative of the aircraft's detected position as indicated by the data source.

3. A method according to claim 1 wherein the step of generating comprises producing on the monitor a three dimensional wireframe indicating the outer boundaries of the error-compensated airspace.

4. A method according to claim 1 wherein the step of generating comprises producing on the monitor a shaded portion of the error-compensated airspace.

5. A method according to claim 1 further comprising the step of generating a first alert if the aircraft's detected position resides outside of the error-compensated airspace.

6. A method according to claim 5 wherein the step of generating the first alert comprises modifying the appearance of the visual representation.

7. A method according to claim 5 wherein the step of generating the first alert comprises changing at least a portion of the visual representation to a first warning color.

8. A method according to claim 7 further comprising the steps of:

projecting the aircraft's flight path for a given time period; and if the aircraft's projected flight path intersects an outer boundary of the error-compensated airspace, generating a second alert.

9. A method according to claim 8 wherein the step of generating a second alert comprises changing at least a portion of the visual representation to a second warning color different than the first warning color.

10. A method according to claim 1 further comprising the step of altering the color of the visual representation in relation to the distance between the aircraft's detected position and the nearest outer boundary of the error-compensated airspace.

11. A method according to claim 1 wherein avionics display system further includes a memory, and wherein the step of attributing comprises recalling from the memory an instrumentation error characteristic associated with the particular type of instrumentation utilized to detect the position of the aircraft.

12. A method according to claim 1 wherein the aircraft is further equipped with a wireless receiver, and wherein the method further comprises the steps of:

receiving, via the wireless receiver, data indicating the detected position of a neighboring aircraft; and if the neighboring aircraft is within a predetermined distance from the aircraft on which the avionics display system is deployed, producing on the monitor a graphic indicating of the neighboring aircraft's detected position.

13. A method according to claim 12 further comprising the steps of:

attributing a second instrumentation error characteristic to the data;

identifying a second airspace assigned to the neighboring aircraft at a given time;

establishing, as a function of the second instrumentation error characteristic and the second assigned airspace, a second error-compensated airspace within which the neighboring aircraft's detected position should reside to ensure that the aircraft's actual position remains within the second airspace; and generating on the monitor a visual representation of the outer boundaries of the second error-compensated airspace.

14. A method according to claim 13 further comprising the step of generating an alert if the neighboring aircraft's detected position resides outside of the second assigned airspace.

15. A non-transitory machine-readable storage medium in conjunction with an avionics display system deployed on an aircraft and including a monitor, the display system receiving position data indicative of the aircraft's detected position from at least one data source comprising instrumentation deployed onboard the aircraft or remote from the aircraft, the program product comprising:

an avionics display program configured to:

attribute an instrumentation error characteristic to the data source;

identify an airspace assigned to the aircraft at a given time;

reducing the volume of the assigned airspace as the magnitude of the instrumentation error characteristic increases to yield an error-compensated airspace, the aircraft's actual position remaining within the assigned airspace provided that the aircraft's detected position resides within the error-compensated airspace; and generate on the monitor a visual representation of the outer boundaries of the error-compensated airspace; and A non-transitory computer-readable media bearing the avionics display program.

16. The non-transitory machine-readable storage medium according to claim 15 wherein the avionics display program is further configured to generate on the monitor a graphic representative of the aircraft's detected position as indicated by the data source.

17. The non-transitory machine-readable storage medium according to claim 15 wherein the avionics display program is further configured to generate a first alert if the aircraft's detected position resides outside of the error-compensated airspace.

18. The non-transitory machine-readable storage medium according to claim 15 wherein the avionics display program is further configured to:

project the aircraft's flight path for a given time period; and if the aircraft's projected flight path intersects an outer boundary of the error-compensated airspace, generate a second alert.

19. An avionics display system for deployment onboard an aircraft including at least one position-determining data source comprising instrumentation deployed onboard the aircraft or remote from the aircraft, the position-determining data source providing the avionics display system with data indicative of the detected position of the aircraft, the avionics display system comprising:

a monitor; and a processor operatively coupled to the monitor and configured to: (i) attribute an instrumentation error characteristic to the data source; (ii) identify an airspace assigned to the aircraft at a given time; (iii) reducing the volume of the assigned airspace as the magnitude of the instrumentation error characteristic increases to yield an error-compensated airspace, the aircraft's actual position remaining within the assigned airspace provided that the aircraft's detected position resides within the error-compensated airspace; and (iv) generating on the monitor a visual representation of the outer boundaries of the error-compensated airspace.

20. A method according to claim 1 wherein the step of establishing comprises:

establishing at least one outer boundary of the assigned airspace; and determining at least one of the outer boundaries of the error-compensated airspace by moving the at least one outer boundary of the assigned airspace inward based upon the magnitude of the instrumentation error characteristic attributed to the data source.

* * * * *